United States Patent [19]

Singhal

[11] Patent Number: 6,003,152
[45] Date of Patent: Dec. 14, 1999

[54] SYSTEM FOR N-BIT PART FAILURE DETECTION USING N-BIT ERROR DETECTING CODES WHERE N LESS THAN N

[75] Inventor: Ashok Singhal, Redwood City, Calif.

[73] Assignee: Sun Microsystems, Inc., Mountain View, Calif.

[21] Appl. No.: 08/885,107

[22] Filed: Jun. 30, 1997

[51] Int. Cl.$^6$ ................................................ G06F 11/10
[52] U.S. Cl. ........................... 714/767; 714/764; 714/758
[58] Field of Search .................................... 714/767, 763, 714/758, 764; 395/458

[56] References Cited

U.S. PATENT DOCUMENTS

| 5,278,847 | 1/1994 | Helbig, Sr. et al. | 714/764 |
| 5,450,423 | 9/1995 | Iwasaka et al. | 714/763 |
| 5,490,155 | 2/1996 | Abdoo et al. | 714/763 |
| 5,644,753 | 7/1997 | Ebrahim et al. | 395/458 |

FOREIGN PATENT DOCUMENTS 0 380 853   8/1990   European Pat. Off. .

OTHER PUBLICATIONS

"32–Bit–Wide Memory Tolerates Failures" NTIS Tech Notes, Oct. 1990, p. 818.

"A Class of Odd–Weight–Column SEC–DED–SbED Codes for Memory System Applications", S. Kaneda, *IEEE Transactions on Computers*, vol. C–33, No. 8 (Aug. 1984).

*Primary Examiner*—Emmanuel L. Moise
*Assistant Examiner*—Esaw Abraham
*Attorney, Agent, or Firm*—Blakely Sokoloff Taylor & Zafman

[57] ABSTRACT

A system for N-bit part failure detection using n-bit error detecting codes where n is less than N is disclosed. In a computer system having storage devices N bits wide and an error detection and correction capability of less than N bits, bit assignments are made so that storage device failures will be detectable because of the manner the effect of a part failure is distributed among multiple codewords. Consequently 8 and 16 bit wide DRAMs may be used in a memory system using error detection and correction codes which are not capable of detecting 8 or 16 bit errors in a codeword, and still preserve the ability to detect the worst errors possibly caused by a part failure. Further, since error detection and correction codes with a predefined error detection and correction capability generally do not double in number of bits required when the data portion of a codeword doubles, the present invention allows use of the remaining bits when using larger data words, not only for special data, but also for another error detection and correction code for the special data, all still preserving the ability to detect any part failures, even when a part failure causes a number of total bit errors far exceeding the error detection capability of the error detection and correction codes.

21 Claims, 1 Drawing Sheet

SYSTEM FOR N-BIT PART FAILURE DETECTION USING N-BIT ERROR DETECTING CODES WHERE N LESS THAN N

BACKGROUND OF THE INVENTION

1. Field of the Invention

The present invention relates to the field of error detection and correction.

2. Prior Art

Error detection and correction (ECC) is commonly used in digital systems wherein the chance of an error occurring on occasion is substantial, and in high reliability systems wherein immunity to even fairly rare errors is desired. Systems of the first kind would include communication systems such as over the air and over phone lines, wherein noise or temporary loss of signal may cause one or more errors in the data received. Systems of the second kind would include fault tolerant computer systems wherein, even though the likelihood of an error is already low, it is desired to correct the more likely of such errors and to detect the presence of the next likely errors so that the system will normally continue operating without error, even when errors in fact occur, and can flag even a level of uncorrectable error.

Various types of error detection and correction codes are well known in the prior art, and accordingly the existence and nature of such codes need not be described in detail herein. In general, such codes provide for the appending of number m of ECC bits (ECC word) to each n-bit dataword, the number of bits m required for the EEC bits being dependent upon the size of the dataword, the number and nature of the errors to be detected and corrected, the number and nature of additional errors, if any, which are to be detected even though the same cannot be corrected, and on the specific code itself.

References describing numerous EEC codes include "Error Correcting Codes, Second Edition", W. Peterson et al., printed by The Massachusetts Institute of Technology (1972), "Error-Correction Coding for Digital Communications", G. Clark et al., printed by Plenum Press (1981) and "A Class of Odd-Weight-Column SEC-DED-SbED Codes for Memory System Applications, S. Kaneda, IEEE Transactions on Computers, Vol. C-33, No. 8 (1984).

The later publication describes what are commonly referred to as SEC-DED-S4ED ECC Codes, which Sun Microsystems, assignee of the present invention, has previously used for error detection and correction in main memory systems. Such codes are characterized by single error correction (SEC), meaning that a single error occurring anywhere in the combination of the dataword and ECC word may be corrected, double error detection (DED), meaning that any two errors in the codeword (a codeword is the combination of the dataword and the ECC word) may be detected even if the same cannot be corrected, and that any errors occurring in a single nibble (a 4-bit sequence bounded by predefined nibble boundaries) may be detected (S4ED). This latter capability provides the capability of detecting the presence of up to four adjacent errors, provided they occur within the same nibble.

In the prior art system referred to above, the dataword is 64 bits long, with the associated SEC-DED-S4ED Code being 8 bits long, providing an entire codeword (data plus ECC) of 72 bits. Integrated memory circuit devices in the past have most commonly been organized with a 4 bit wide output, with 72 bit wide SIMMs being readily commercially available using eighteen, 4 bit wide dynamic random access memories (DRAMs). In such a system, the ability to detect errors in any nibble of each 72 bit codeword provides the ability to detect the failure of any one of the eighteen memory devices, simply by having each 4 bit memory device output comprise a nibble in accordance with the SEC-DED-S4ED Code definition. Consequently, failures confined to a single memory device, such as a total device failure, a single line failure, an addressing failure, etc. may be detected. Thus, the most likely uncommon errors can be either detected and corrected, or at least detected. Specifically, the occasional random error (commonly referred to as soft errors because of their generally non-recurring nature) will be corrected. Since such errors only occur in 1 in N memory operations, where N is normally a very large number, the likelihood of occurrence of two such errors at the same time will be 1 in $N^2$, a very unlikely occurrence which will still be detected. The likelihood of three random errors occurring at the same time will be 1 in $N^3$. While three such errors will be detected only if they occur in the same nibble, the likelihood of three random errors occurring at the same time in different nibbles in normal DRAM devices is quite remote. The possibility of a device failure, however, is sufficient to make the detection of such failures highly desirable. Such failures are normally hard failures (a permanent device fault or failure), making the detection of such errors particularly important.

More recently, DRAM devices organized with 8 bit wide outputs and 16 bit wide outputs have become common. Consequently, an SEC-DED-S4ED Code will not normally detect device failures in devices having 8 bit or 16 bit outputs when such devices are used to provide corresponding 8 or 16 bits of the 72 bit codeword. However, in the prior art system, the main memory is organized so that on each read operation, four 72 bit codewords are read from main memory simultaneously. DRAMs using a 4 bit wide output are used with 1 bit of each 4 bit output being associated with a respective one of the four codewords read simultaneously. In this manner, when a DRAM fails (and this is the only error occurring at that time) errors will appear in only a single bit of each of the four codewords, making the DRAM failure correctable with the SEC-DED-S4ED Code of the respective four codewords.

SUMMARY OF THE INVENTION

A system for N-bit part failure detection using n-bit error detecting codes where n is less than N is disclosed. In a computer system having storage devices N bits wide and an error detection and correction capability of less than N bits, bit assignments are made so that storage device failures will be detectable because of the manner the effect of a part failure is distributed among multiple codewords. The net result of the present invention is that 8 and 16 bit wide DRAMs may be used in a memory system using error detection and correction codes which are not capable of detecting 8 or 16 bit errors in a codeword, and still preserve the ability to detect the worst errors possibly caused by a part failure. Further, since error detection and correction codes with a predefined error detection and correction capability generally do not double in number of bits required when the data portion of a codeword doubles, the present invention allows use of the remaining bits when using larger data words, not only for special data, but also for another error detection and correction code for the special data, all still preserving the ability to detect any part failures, even when a part failure causes a number of total bit errors far exceeding the error detection capability of the error detection and correction codes.

DETAILED DESCRIPTION OF THE PRESENT INVENTION

Figure 1:
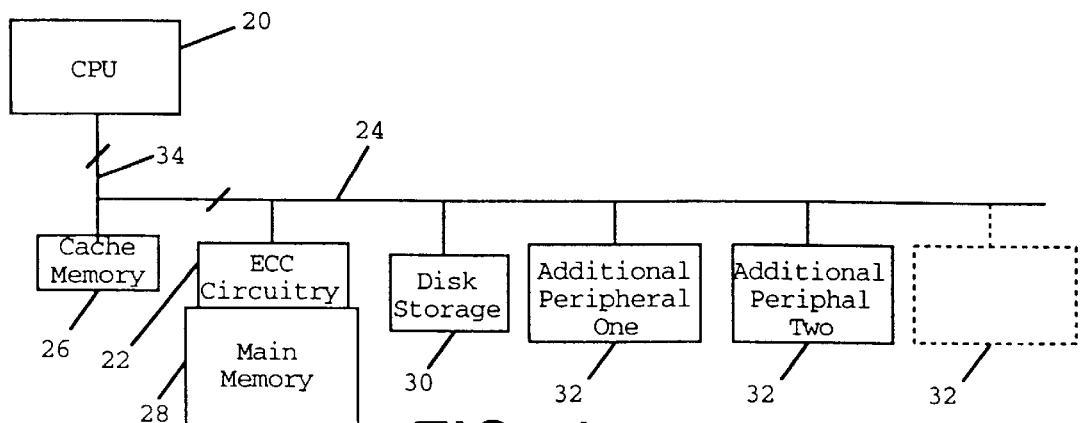
FIG. 1 is a block diagram of a typical computer system in which the present invention may be used.

First referring to FIG. 1, a block diagram for a typical computer system for which the present invention may be used can be seen. This Figure represents a relatively typical generic computer system, though of course the present invention may be used in computer systems of other configurations. As shown specifically in FIG. 1, a central processing unit 20, in the preferred embodiment a single integrated circuit central processing unit, is coupled through on-chip ECC circuitry 22 to a system bus 24, coupling the CPU to cache memory 26, main memory 28, typically one or more disk storage units 30 and one or more additional peripheral units 32, such as printers, fax modems, network connections, etc. In one particular preferred embodiment the system bus 24 includes a data bus 144 bits wide, twice the data bus width of a prior art system having a 72 bit wide data bus consisting of 64 data bits and 8 error detection and correction bits.

As shown in FIG. 1, the ECC circuitry 22 is positioned between the main memory 28 and the bus 24 so as to be capable of generating the proper ECC bits to be associated with the data bits sent by the central processing unit 20 to the memory 28 for storage therein. The ECC bits, in turn, allow the ECC circuitry to undertake error detection and correction on the bits received from the memory 28 so that the most likely of possible errors in the data portion of the information received from the memory can be corrected and the next level of errors at least detected. In that regard, in the preferred embodiment, the bus between the CPU 20 and the memory 28 is a 576 bit bus, allowing the simultaneous storage in memory and the simultaneous reading back from memory, memory words of 576 bits consisting of four 144 bit words, each of which has, as shall subsequently be seen, an identical format.

In a general sense, in the preferred embodiment of the present invention, bit assignments are made between groups of N bits (144 in the exemplary embodiment), each in such a manner as to provide enhanced error detection and correction capabilities and to provide for the inclusion of special data having its own error detection and correction code. This provides groups of N bits, each group having two data portions, each with its associated ECC code, the ECC codes being different from each other. The N bits are sometimes referred to as "quadwords" herein.

In the specific embodiment being described, a quadword comprises 144 bits, with four quadwords (576 bits) representing a main memory word in a main memory system. More specifically, in the preferred embodiment, the primary dataword associated with a quadword is 128 bits long. The ECC word which is associated with this dataword is again an SEC-DED-S4ED ECC word, which for a 128 bit dataword, is 9 bits long. This then leaves 7 bits of the 144 bit quadword free for other uses. In the preferred embodiment, three of these 7 bits are used for special data (referred to herein as a "special dataword" for convenient reference), with 4 bits being used as an ECC word associated with a special dataword, specifically an SEC-DED codeword.

Figure 2:
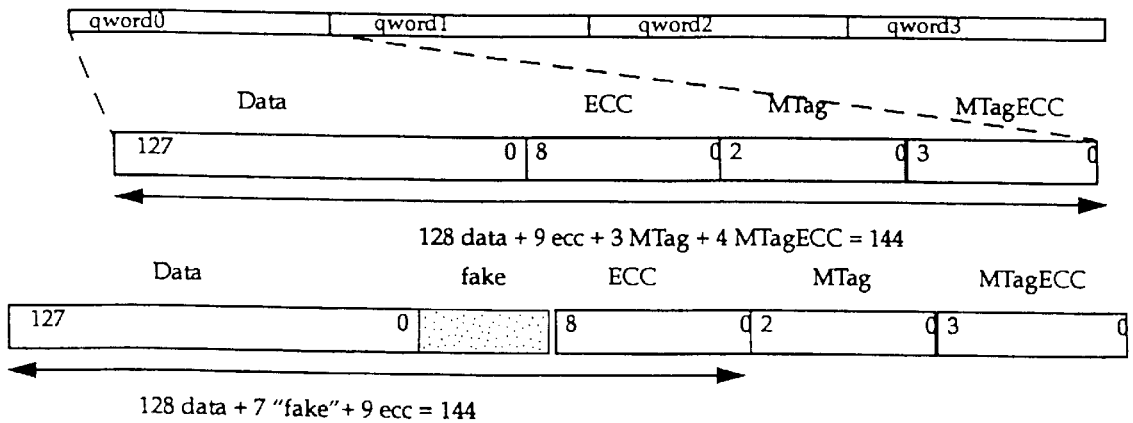
FIG. 2 illustrates the general organization of the quadwords (qwords) in the preferred embodiment.

The general organization of the quadwords (qwords) in the preferred embodiment is as illustrated in FIG. 2. Each main memory read reads four quadwords at a time, in FIG. 2, quadwords qword0 through qword3. (In the claims that follow, a memory word is not necessarily limited to 4 qwords, the word qword being used in the more general sense unless specifically limited to 4.) The 144 bits of each qword is segregated into 128 bits of data, 9 bits of ECC for the 128 bits of data, 3 bits for the mtag (special data) and 4 bits for the mtag ECC. The 9 bits of ECC for the 128 bits of primary data actually provides single error detection and correction, double error detection and the detection of any number of errors in a single nibble for a full 144 bit codeword, which of course would consist of 135 bits of information plus the 9 bit ECC. The 135 bits could consist of the 128 bits of primary data plus the 3 bits of mtag (special data) plus 4 bits of mtag ECC. However, this would require plural serial coding and decoding, namely first determining the mtag ECC and then using the mtag and mtag ECC as part of the 135 bits, and the reverse on decoding. It also would burden the ECC capability of the 9 bits of ECC for the primary data with any error in the mtag or mtage ECC. Instead, the ECC for the 128 bits of primary data is decoupled from the mtag and its ECC by instead substituting 7 predetermined "fake" bits for the mtag/mtag ECC bits during ECC coding and decoding of the codeword containing the primary data. Thus, as shown in FIG. 2, the 128 bit dataword is combined with 7 fake bits to make up the full 135 bit dataword for ECC analysis. These fake bits are combined with the 128 bit dataword so that the associated ECC word can be determined and stored therewith whenever a new memory word is stored. Similarly, upon reading of a memory word, fake bits are again combined with each 128 bit dataword for error detection and correction purposes. Generally speaking, the fake bits may be any bit pattern and located anywhere in the 135 bits, provided the same fake bits in the same positions in the 135 bits are used when determining the ECC word to be stored with a dataword as are used in the subsequent ECC analysis upon reading a memory word. Typically, though not necessarily, the fake bits will precede or be appended to the actual dataword and will consist of a string of all zeros or of all ones. In the embodiment shown in FIG. 2, the 7 fake bits are shown appended to the data bits.

The purpose of the preferred embodiment is to detect entire part failures in a memory, organized as shown in FIG. 2, when using 8 bit wide or 16 bit wide DRAMs, and to detect and correct all 4 bit wide part failures. The 16 bit DRAMs present the worst case, as clearly the ECC codes themselves are not capable of detecting 16 bit errors. For the primary data portion of the four quadwords, the 16 bits of a single DRAM can be spread 4 bits to each quadword, thus making a part failure detectable by the SEC-DED-S4ED code. However, the mtag ECC is not a -S4ED code, and accordingly, spreading the 16 bits of a DRAM to the mtag/mtag ECC portion of each quadword, 4 bits per quadword, does not allow detection of a part failure through the mtag ECC. Instead, since the mtag/mtag ECC section of a given quadword is not able to detect more than 2 bit errors, it is essential to assign each mtag/mtag ECC section no more than 2 bits from any one DRAM.

Four quadwords accessed at any one time in the embodiment being described consist of 576 bits, in turn consisting of the 16 bit output of thirty-six 16 bit wide DRAMs. In one specific exemplary embodiment, the bit assignments for each DRAM are set forth in Table 1. In this table, the column labeled "Signal (Nibbles)" relates to the four quadwords as shown in FIG. 2. The thirty-six DRAMs themselves are numbered 0 through 35, using the convention D[DRAM number(s)][bit(s)]. Thus, using this convention, D[0,1,2,3][0] refers to bit 0 from each of the DRAMs 0, 1, 2 and 3, whereas D[3][4,8,12] refers to bits 4, 8 and 12 of DRAM 3.

specifically, in the case of single error correction and double error detection, the detection of a single correctable error in the ECC is indicative of the absence of an additional error in either the ECC or the associated dataword.)

The bit assignments in the first two lines of Table 1 use the first 8 bits (least significant bits) of DRAMs D0, D1 and D2, and the first 4 bits of DRAM D3. This leaves 8 bits of DRAMs D0, D1 and D2 so far unused, and 12 bits of DRAM D3 so far unused, totaling 36 bits. These 36 bits are used in

TABLE 1

| signal (nibbles) | QWord 0 | QWord1 | QWord2 | QWord3 |
|---|---|---|---|---|
| MTagECC[0,1,2,3] | D[0,1,2,3][0] | D[0,1,2,3][1] | D[0,1,2,3][2] | D[0,1,2,3][3] |
| MTag[0,1,2] | D[0,1,2][4] | D[0,1,2][5] | D[0,1,2][6] | D[0,1,2][7] |
| ECC[4] | D[0][8] | D[0][9] | D[0][10] | D[0][11] |
| Data[0,1,2,3] | D[3][4,8,12],D[1][8] | D[3][5,9,13],D[1][9] | D[3][6,10,14],D[1][10] | D[3][7,11,15],D[1][11] |
| Data[4,5,6,7] | D[2][8],D[0,1,2][12] | D[2][9],D[0,1,2][13] | D[2][10],D[0,1,2][14] | D[2][11],D[0,1,2][15] |
| Data[8,9,10,11] | D[4][0,4,8,12] | D[4][1,5,9,13] | D[4][2,6,10,14] | D[4][3,7,11,15] |
| Data[12,13,14,15] | D[5][0,4,8,12] | D[5][1,5,9,13] | D[5][2,6,10,14] | D[5][3,7,11,15] |
| Data[16,17,18,19] | D[6][0,4,8,12] | D[6][1,5,9,13] | D[6][2,6,10,14] | D[6][3,7,11,15] |
| Data[20,21,22,23] | D[7][0,4,8,12] | D[7][1,5,9,13] | D[7][2,6,10,14] | D[7][3,7,11,15] |
| Data[24,25,26,27] | D[8][0,4,8,12] | D[8][1,5,9,13] | D[8][2,6,10,14] | D[8][3,7,11,15] |
| Data[28,29,30,31] | D[9][0,4,8,12] | D[9][1,5,9,13] | D[9][2,6,10,14] | D[9][3,7,11,15] |
| Data[32,33,34,35] | D[10][0,4,8,12] | D[10][1,5,9,13] | D[10][2,6,10,14] | D[10][3,7,11,15] |
| Data[36,37,38,39] | D[11][0,4,8,12] | D[11][1,5,9,13] | D[11][2,6,10,14] | D[11][3,7,11,15] |
| Data[40,41,42,43] | D[12][0,4,8,12] | D[12][1,5,9,13] | D[12][2,6,10,14] | D[12][3,7,11,15] |
| Data[44,45,46,47] | D[13][0,4,8,12] | D[13][1,5,9,13] | D[13][2,6,10,14] | D[13][3,7,11,15] |
| Data[48,49,50],ECC[2] | D[14][0,4,8,12] | D[14][1,5,9,13] | D[14][2,6,10,14] | D[14][3,7,11,15] |
| Data[51,52,53],ECC[1] | D[15][0,4,8,12] | D[15][1,5,9,13] | D[15][2,6,10,14] | D[15][3,7,11,15] |
| Data[54,55],ECC[3,0]] | D[16][0,4,8,12] | D[16][1,5,9,13] | D[16][2,6,10,14] | D[16][3,7,11,15] |
| Data[56,57,58,59] | D[17][0,4,8,12] | D[17][1,5,9,13] | D[17][2,6,10,14] | D[17][3,7,11,15] |
| Data[60,61,62,63] | D[18][0,4,8,12] | D[18][1,5,9,13] | D[18][2,6,10,14] | D[18][3,7,11,15] |
| Data[64,65,66,67] | D[19][0,4,8,12] | D[19][1,5,9,13] | D[19][2,6,10,14] | D[19][3,7,11,15] |
| Data[68,69,70,71] | D[20][0,4,8,12] | D[20][1,5,9,13] | D[20][2,6,10,14] | D[20][3,7,11,15] |
| ECC[8,5],Data[72,73] | D[21][0,4,8,12] | D[21][1,5,9,13] | D[21][2,6,10,14] | D[21][3,7,11,15] |
| ECC[7],Data[74,75,76] | D[22][0,4,8,12] | D[22][1,5,9,13] | D[22][2,6,10,14] | D[22][3,7,11,15] |
| ECC[6],Data[77,78,79] | D[23][0,4,8,12] | D[23][1,5,9,13] | D[23][2,6,10,14] | D[23][3,7,11,15] |
| Data[80,81,82,83] | D[24][0,4,8,12] | D[24][1,5,9,13] | D[24][2,6,10,14] | D[24][3,7,11,15] |
| Data[84,85,86,87] | D[25][0,4,8,12] | D[25][1,5,9,13] | D[25][2,6,10,14] | D[25][3,7,11,15] |
| Data[88,89,90,91] | D[26][0,4,8,12] | D[26][1,5,9,13] | D[26][2,6,10,14] | D[26][3,7,11,15] |
| Data[92,93,94,95] | D[27][0,4,8,12] | D[27][1,5,9,13] | D[27][2,6,10,14] | D[27][3,7,11,15] |
| Data[96,97,98,99] | D[28][0,4,8,12] | D[28][1,5,9,13] | D[28][2,6,10,14] | D[28][3,7,11,15] |
| Data[100,101,102,103] | D[29][0,4,8,12] | D[29][1,5,9,13] | D[29][2,6,10,14] | D[29][3,7,11,15] |
| Data[104,105,106,107] | D[30][0,4,8,12] | D[30][1,5,9,13] | D[30][2,6,10,14] | D[30][3,7,11,15] |
| Data[108,109,110,111] | D[31][0,4,8,12] | D[31][1,5,9,13] | D[31][2,6,10,14] | D[31][3,7,11,15] |
| Data[112,113,114,115] | D[32][0,4,8,12] | D[32][1,5,9,13] | D[32][2,6,10,14] | D[32][3,7,11,15] |
| Data[116,117,118,119] | D[33][0,4,8,12] | D[33][1,5,9,13] | D[33][2,6,10,14] | D[33][3,7,11,15] |
| Data[120,121,122,123] | D[34][0,4,8,12] | D[34][1,5,9,13] | D[34][2,6,10,14] | D[34][3,7,11,15] |
| Data[124,125,126,127] | D[35][0,4,8,12] | D[35][1,5,9,13] | D[35][2,6,10,14] | D[35][3,7,11,15] |

Now referring specifically to Table 1, it may be seen in the first line of the table that the four bits 0, 1, 2, 3 of each mtag ECC is comprised of a single bit taken from each of four DRAMs. Specifically, for qword0 (quadword 0), the 0 bit of DRAMs 0, 1, 2 and 3 is used, whereas for qword1 the 1 bit of DRAMs 0, 1, 2 and 3 is used, etc. Similarly, for the mtag for the four qwords, the bits 0, 1 and 2 are each taken from DRAMs 4 through 7, one bit from each DRAM. Thus, considering the special dataword comprising the mtag and mtag ECC of each of the four qwords, no special dataword has more than one bit taken from an individual DRAM. Since the ECC is a single error correction, double error detection code, a single 4 bit wide part failure affecting either the mtag or the mtag ECC will be both detected and corrected, and even 2 bit errors will at least be detected, regardless of where the errors occur and whether they are due to random errors, two part failures, or one part failure and one random error. (Note that the correction of errors is used in a general sense, in that correctable errors occurring in the ECC portion itself need not be, and generally are not corrected before the data is used, as a correctable error in the ECC bits does not affect the accuracy of the data itself. More the next three lines of Table 1 for bit 4 of the ECC codeword associated with the primary data, and bits 0 through 7 of the primary dataword. Thereafter, the remaining 32 DRAMs D[4] through D[35] have the primary data bit/primary data ECC bit assignment shown in the remainder of Table 1.

The specific assignment shown in the table, of course, represents only one of a large number of possible assignments which will achieve the desired part failure detection, not only in the primary data section, but in the special data section of the quadword when using 16 bit wide devices. The specific assignment shown, however, was chosen because of its layout advantages when being reduced to an actual circuit layout.

With the foregoing DRAM bit assignments, a part failure in either of DRAMs D[0], D[1] or D[2] will result in a 2 bit uncorrectable error in the mtag/mtag ECC portion of all four quadwords, and a 2 bit uncorrectable error in the primary data/ECC portions of all four quadwords. For DRAM D[3], a part failure results in a 1 bit correctable error in the mtag/mtag ECC portion of all four quadwords and a 3 bit uncorrectable nibble error in the primary data/ECC portion of all four quadwords. For all of the rest of the DRAMs (D[4] through D[35]), a part failure results in a 4 bit nibble uncorrectable error in all four codewords. In that regard, all of the foregoing uncorrectable errors are detectable, however. Further, the foregoing errors caused by a part failure represent the maximum number of errors a part failure may cause. By way of example, if the actual data for a particular nibble for a particular part was 1111, and the part failure clamped all 4 bits of the nibble in the one state, no error would be detected by the ECC. If the data instead was, by way of example, 1101, then the error would be detected as a single error and would be correctable by the codes used in the preferred embodiment. Of course, if the data for a particular nibble was 1111 but the failure pulled that particular nibble of that DRAM to all zeros, then all 4 bits of the nibble would be in error, still being detectable but not correctable for all DRAMs except DRAM 3.

Figure 3:
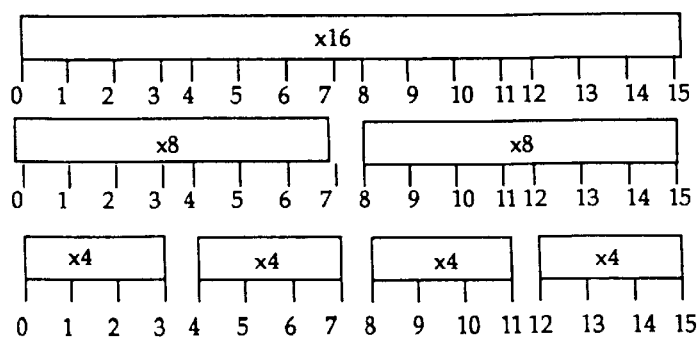
FIG. 3 illustrates how the present invention may be readily used with 8 bit and 4 bit devices by using, for each 16 bit wide device, two 8 bit wide devices or four 4 bit wide devices with the bit assignments for such devices shown, relative to the bit assignments of the 16 bit devices.

Having now described a preferred embodiment of the present invention, the same may be readily used with 8 bit and 4 bit devices by using, for each 16 bit wide device, two 8 bit wide devices or four 4 bit wide devices with the bit assignments, relative to the bit assignments of the 16 bit devices, being shown in FIG. 3.

The net result of the present invention is that 8 and 16 bit wide DRAMs may be used in a memory system using error detection and correction codes which are not capable of detecting 8 or 16 bit errors in a codeword, and still preserve the ability to detect the worst errors possibly caused by a part failure. Further, since error detection and correction codes with a predefined error detection and correction capability generally do not double in number of bits required when the data portion of a codeword doubles, the present invention allows use of the remaining bits not only for special data, but also for another error detection and correction code for the special data, all still preserving the ability to detect any part failures, even when a part failure causes a number of total bit errors far exceeding the error detection capability of the error detection and correction codes.

While preferred embodiments of the present invention have been disclosed and described herein, it will be understood by those skilled in the art that various changes in form and detail may be made therein without departing from the spirit and scope thereof.

What is claimed is:

1. In a computer system, the improvement comprising:
   a storage system for storing, and for providing as an output, M bits at a time, the storage system having S storage devices, each storage device being organized to receive and output N bits at a time, where S times N is at least M, the M bits being organized into a plurality of qwords, each qword being of the same format, each qword having two data words of different sizes, each with an associated error detection word, thereby forming two codewords within each qword, the two error detection codes being different, the error detection codes each having error detection limits of less than N bits; and
   an error detection system coupled to detect errors in each codeword in the M bit word; wherein
   the N bits of each storage device being distributed between codewords in each M bits so that the number of bits N of each storage device in each codeword does not exceed the error detection capability of the error detection code of the respective codeword.

2. The improvement of claim 1 wherein one of the error detection codes is a SEC-DED-S4ED code.

3. The improvement of claim 1 wherein one of the error detection codes is a SEC-DED code.

4. The improvement of claim 1 wherein one of the error detection codes is a SEC-DED-S4ED code and the other error detection code is a SEC-DED code.

5. The improvement of claim 1 wherein the number of qwords in each M bits is 4.

6. The improvement of claim 5 wherein M is 576.

7. The improvement of claim 5 wherein N is 16.

8. The improvement of claim 5 wherein N is 8.

9. The improvement of claim 1 wherein the error detection code of one of the codewords has an error detection capability for a number of bits exceeding, by X bits, the number of bits in that codeword, and wherein the error detection system combines X fake bits with the respective codeword before error detection and correction.

10. A computer system comprising:
    a central processing unit;
    a storage system for storing, and for providing as an output, M bits at a time, the storage system having S storage devices, each storage device being organized to receive and output N bits at a time, where S times N is at least M, the M bits being organized to have two data words of different sizes, each with an associated error detection word, thereby forming two codewords in the M bits, the two error detection codes being different, the error detection codes having error detection limits of less than N bits; and
    an error detection system coupled between the central processing unit and the storage system to determine and associate error detection code bits with each data word for data flowing from the central processing unit to the storage system to provide the M bit word to the storage system, and to detect errors in each codeword in the M bit word for data flowing from the storage system to the central processing unit; wherein
    the N bits of each storage device being distributed between the two codewords so that the number of bits of each storage device in each codeword does not exceed the error detection capability of the error detection code of the respective codeword.

11. The computer system of claim 10 wherein the central processing unit is an integrated circuit central processing unit, and wherein the error detection system is on the same integrated circuit.

12. The computer system of claim 10 wherein the storage system is a main memory system.

13. The computer system of claim 10 wherein one of the error detection codes is a SEC-DED-S4ED code.

14. The computer system of claim 10 wherein one of the error detection codes is a SEC-DED code.

15. The computer system of claim 10 wherein one of the error detection codes is a SEC-DED-S4ED code and the other error detection code is a SEC-DED code.

16. The computer system of claim 10 wherein the number of qwords in each M bits is 4.

17. The computer system of claim 16 wherein M is 576.

18. The computer system of claim 16 wherein N is 16.

19. The computer system of claim 16 wherein N is 8.

20. The computer system of claim 10 wherein the error detection code of one of the codewords has an error detection capability for a number of bits exceeding, by X bits, the number of bits in that codeword, and wherein, for data flowing from the central processing unit to the storage system, the error detection system combines X fake bits with the respective data word to determine the respective error detection word, and wherein, for data flowing from the storage system to the central processing unit, the error detection system combines X fake bits with the respective data word prior to detecting and correcting errors in the respective data word.

21. A computer system comprising:

a storage system for storing, and for providing as an output, M bits at a time, the storage system having S storage devices, each storage device being organized to receive and output N bits at a time, where S times N is at least M, the M bits being organized to have at least two data words of different sizes, each with an associated error detection word, thereby forming at least two codewords in the M bits, at least two of the error detection codes being different, the error detection codes having error detection limits of less than N bits; and an error detection system coupled to detect errors in each codeword in the M bit word; wherein the N bits of each storage device being distributed between the codewords so that the number of bits of each storage device in each codeword does not exceed the error detection capability of the error detection code of the respective codeword.

* * * * *